Patented Jan. 26, 1954

2,667,486

UNITED STATES PATENT OFFICE 2,667,486

2,4-DIAMINO PTERIDINE AND DERIVATIVES

Cornelius K. Cain, Flourtown, Pa., assignor to Research Corporation, New York, N. Y., a corporation of New York No Drawing. Application May 24, 1951,
Serial No. 228,139

2 Claims. (Cl. 260—251.5)

This invention lies in the field of organic chemistry, where the terms "pterin" and "pteridine" have long been applied to certain ring systems composed of fused pyrimidine and pyrazine rings—and many such systems are known. The invention particularly relates to a new series of anti-bacterial compounds, 2,4-diaminopteridine, also called 2,4 - diaminopyrimido-[4,5-b]pyrazine, and its substitution products.

The structural formula of the compounds of the invention is as follows:

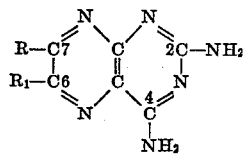

This differs from the pteridine portion of pterins previously known in that it has two amino groups on the pyrimidine ring, one at the 2 position and one at the 4 position. Some previous pterins such as folic acid for example have had an amino group at the 2 position but with an hydroxyl group at the 4 position. So far as known this new synthetic pterin is the first to have a 2,4 diamino structure.

Substituents R and $R_1$ in the 6 and 7 positions of the above formula may be the same or any two different groups selected from the following: hydrogen; alkyl; aryl; substituted aryl containing halogen, hydroxyl or derivatives of the hydroxyl, nitro, amino, substituted amino, or sulfonic acid groups as substituents; hydroxyl; amino; substituted amino; halogen; carboxy; derivatives of the carboxy group such as salts, esters, amides, etc.; carboxyalkyl such as carboxymethyl and its derivatives such as esters, etc.; oxoalkyl; condensed aromatic systems such as phenanthro and acenaphtho with and without substituents; 5- or 6-membered heterocyclic systems such as pyrimido or imidazolo; and condensed heterocyclic systems.

In numbering the particular positions in the pterin structure the conventional method commonly used at present in this country in chemical publications has been followed. While other conventions for numbering have sometimes been used, the meaning of the present invention will be clear to those skilled in the art from the structural diagram and description given herein, whether these or equivalent symbols are applied. The position numbers used in the specification and claims will be understood to include such equivalents, since they refer to the same scientific fact.

While the present invention is not limited to any particular process, I have found that a satisfactory process for producing the compounds of the structure described consists in the reaction of 2,4,5,6-tetraminopyrimidine or its salts with 1,2-dicarbonyl compounds, 1,2-dicarboxylic acids, or with α-carbonyl acids or their derivatives such as esters, etc., in aqueous, nonaqueous or mixed solutions of acidic, neutral or basic reaction.

By way of example I will describe in greater detail some typical examples whcih are merely illustrative of methods of obtaining these compounds and not intended to limit the scope of the invention.

Example I.—2,4-diaminopteridine

To 2.0 g. of 2,4,5,6-tetraminopyrimidine sulfate dissolved in 70 cc. of hot water was added a solution of 3.5 g. of glyoxal bisulfite in 30 cc. of hot water. The clear yellow reaction mixture was boiled for 15 minutes, treated with charcoal, and allowed to cool slowly. The light yellow microcrystalline precipitate which formed was collected by filtration, washed with water followed by acetone, and dried in vacuo.

The material may be recrystallized from water, or may be purified by sublimation at 180 degrees at 1 mm. pressure.

Example II.—2,4-diamino-7-methylpteridine

A mixture of 6 g. of methyl glyoxal, 15 g. of 2,4,5,6-tetra-aminopyrimidine bisulfite and 200 cc. of water was refluxed for 1 hour. After cooling, the product was collected by filtration and washed with water. Recrystallization from 0.1 N HCl gave prisms showing parallel extinction and darkening without melting upon heating.

Oxidation of the compound of Example II with potassium permanganate gives 2,4-diamino-7-pteridinecarboxylic acid, as a light yellow microcrystalline solid darkening slowly without melting on heating to 300°.

Example III.—2,4-diamino-6,7-bis(p-aminophenyl) pteridine

A mixture of 1.0 g. of p,p'-diaminobenzil sulfate and 1.0 g. of 2,4,5,6-tetraminopyrimidine sulfate in 50 cc. of water was refluxed for two hours. The clear red reaction mixture was treated with charcoal and poured into a boiling solution of dilute NaOH of sufficient strength so that the final solution was at pH 10. Light orange needles of the desired product started to separate at once. After standing at room temperature for 15 minutes, the crystals were filtered off and washed thoroughly with water.

Treatment of the hydrochloride of 6,7-bis-(p-aminophenyl) compound of this example with formaldehyde in boiling water gives the 6,7-bis(p-hydroxymethylaminophenyl) compound.

*Example IV.—2,4-diaminophenanthro[9,10-e]-pyrimido[4,5]pyrazine-8- (or 11-) sulfonic acid*

A solution of 5 g. of 2,4,5,6-tetraminopyrimidine bisulfite in 20 cc. of dilute sodium hydroxide (0.5%) was added to a solution of 5 g. of phenanthrenequinone-3-sulfonic acid in 130 cc. of water, and the resulting deep green mixture refluxed for one half hour. The reaction mixture was treated with charcoal and then acidified to pH 5 with concentrated hydrochloric acid. The bright yellow solid which separated was collected by filtration and washed with water followed by acetone.

*Example V.—2,4-diamino-6,7-dihydroxypteridine*

Sixteen g. of 2,4,5,6-tetraminopyrimidine bisulfite were ground with 63 g. of oxalic acid and placed in a large test tube heated by a metal bath to 150 degrees. Over a period of one hour the temperature was gradually raised to 260 degrees, and then maintained there for an additional fifteen minutes. After cooling, the fusion mixture was dissolved in 800 cc. of 0.5 N NaOH, treated with charcoal, and poured into 300 cc. of boiling 2 N HCl. The light yellow solid which separated was collected by filtration and washed thoroughly with water. It was purified by dissolving in 600 cc. of 0.5 N sodium hydroxide, treating again with charcoal, and pouring into 250 cc. of boiling hydrochloric acid.

*Example VI.—2,4-diamino-6,8-dihydroxydipyrimido[4,5-b,5'4'-e]pyrazine*

To 1 cg. of 2,4,5,6-tetraminopyrimidine sulfate suspended in 10 cc. of water and cooled to 0° was added a solution of 0.75 g. of alloxan monohydrate in 10 cc. of water. After one half hour at 0°, the reaction mixture was removed from the ice bath and allowed to stand with occasional stirring at room temperature for two days. The bright orange crystalline solid was collected by filtration, suspended in 50 cc. of water and the mixture refluxed for one half hour to give bright yellow 2,4-diamino-6,8-dihydroxy-dipyrimido[4,5-b,5'4'-e]pyrazine.

*Example VII.—2,4-diamino-6,7-dimethylpyrimido[4,5-b]pyrazine*

This compound was prepared by warming a mixture of 50 g. of 2,4,5,6-tetraminopyrimidine bisulfite, 20 ml. of biacetyl and 300 ml. of water to approximately 80° for one hour. Recrystallization from 0.1 N hydrochloric acid gave small prisms exhibiting parallel extinction and progressively darkening without melting upon heating.

The 6,7-dimethyl compound of this example can be converted into the corresponding 6,7-dicarboxylic acid by oxidation with potassium permanganate.

*Example VIII.—2,4-diamino-6,7-diphenylpyrimido[4,5-b]pyrazine*

A mixture of 5 g. of benzil, 5 g. of 2,4,5,6-tetraminopyrimidine bisulfite, 3 ml. of concentrated hydrochloric acid, 50 ml. of ethanol, 50 ml. of methyl ethyl ketone and 100 ml. of water was refluxed for two hours. The solid which separated on changing the pH to 6 and cooling was recrystallized from 80% formic acid to give small elongated prisms. The crystals exhibited parallel extinction and melted with decomposition at 280–283° (cor.).

*Example IX.—2,4-diaminoacenaphtho[1,2-e]-pyrimido[4,5-b]pyrazine*

A solution of 1.0 g. of acenaphthenequinone in 25 ml. of dimethylformamide was added to a mixture of 4.5 g. of 2,4,5,6-tetraminopyrimidine bisulfite, 50 ml. of water and 5 ml. of concentrated hydrochloric acid. After heating for four hours on the steam-bath, the mixture was adjusted to pH 6 and cooled. The solid obtained was recrystallized from 80% formic acid to give small needles which showed parallel extinction and which progressively darkened without melting upon heating.

*Example X.—2,4-diaminophenanthro[9,10-e]-pyrimido[4,5-b]pyrazine*

A mixture of 2 g. of 2,4,5,6-tetraminopyrimidine bisulfite, 1.5 g. of phenanthrenequinone, 250 ml. of 95% ethanol and 5 ml. of 10% aqueous sodium hydroxide was refluxed for six hours. The solid which separated on cooling was crystallized from 80% formic acid to give sheaves of small needles exhibiting parallel extinction. Upon heating, the crystals began to sinter at approximately 340° and progressively darkened without melting.

*Example XI.—2,4-diamino-6,7-bis-(p-acetamidophenyl)-pteridine*

A solution of 1.10 g. (0.00785 mole) of 2,4,5,6-tetraminopyrimidine in 75 ml. of water and a solution of 1.35 g. (0.00417 mole) of p,p'-diacetamidobenzil in 100 ml. of ethanol were mixed and refluxed for seven hours. After treatment with Norit, the ethanol was removed by distillation under reduced pressure. Upon cooling and filtering, 1.46 g. of yellow crystals was obtained. Recrystallization from 50% aqueous acetic acid gave small, slender needles showing oblique extinction, M. P. 234–237° (cor.).

*Example XII.—2,4-diamino-6,7-bis-(m-nitrophenyl)-pteridine*

A solution of 3.0 g. (0.0214 mole) of 2,4,5,6-tetraminopyrimidine and 2.0 g. (0.0066 mole) of 3,3'-dinitrobenzil in a mixture of 70 ml. of ethanol and 15 ml. of ethyl methyl ketone was refluxed for three hours. The heavy yellow solid which had separated from the reaction mixture was filtered off, washed with boiling water, and recrystallized by dissolving in a small amount of glacial acetic acid, treating with Norit, and pouring into a ten-fold excess of boiling water. After two additional recrystallizations, the product was obtained in the form of thin rods and sheets showing oblique extinction, M. P. 307–308° (cor.).

Other typical compounds of the invention which may be made by methods similar to those heretofore described are:

2,4-diamino-7-phenylpteridine, melting at 338–340°, from 2,4,5,6-tetraminopyrimidine hydochloride and phenylglyoxal.

2,4-diamino-6-methyl-7-phenylpteridine, melting at 314–320°, from 2,4,5,6-tetraminopyrimidine hydrochloride and phenylmethylglyoxal.

2,4-diamino-6-hydroxypteridine, from 2,4,5,6-tetraminopyrimidine hydrochloride and glyoxalic acid; converted to 2,4-diamino-6-carboxymethoxypteridine, decomposing above 300°, by reaction with chloroacetic acid.

2,4 - diamino - 6,7-bis(p-hydroxyphenyl)pteridine, decomposing above 300°, from 2,4,5,6-tetraminopyrimidine bisulfite and p,p'-dihydroxybenzil.

2,4 - diamino-6,7-bis(m-nitrophenyl)pteridine, melting at 307–308°, from 2,4,5,6-tetraminopyrimidine and m,m'-dinitrobenzil.

2,4 - diamino - 6 - (p-nitrophenyl)-7-phenyl-pteridine, melting at 314–315°, from 2,4,6-triamino-5-nitrosopyrimidine and p'-nitrodesoxybenzoin; reduced by catalytic hydrogenation to the corresponding 6-(p-aminophenyl) compound, melting point, 305–306°.

2,4 - diamino - 6,7-bis(o-hydroxyphenyl)pteridine, melting at 304–306°, from 2,4,5,6-tetraminopyrimidine sulfate and o,o'-dihydroxybenzil.

2,4-diamino-6,7-bis(p-nitrophenyl) - pteridine, melting at 343°, from 2,4,5,6-tetraminopyrimidine and p,p'-dinitrobenzil.

2,4-diamino-6-phenyl-7-(p-nitrophenyl)-pteridine, melting at 307–308°, from 2,4,5,6-tetraminopyrimidine and p-nitrobenzil.

The compounds containing an arylamino group can be converted to the corresponding hydroxy and halogen derivatives by well known methods and the compounds containing carboxy groups can readily be esterified to give the corresponding esters, particularly the lower alkyl esters. Amino groups may also be converted to substituted amino groups by conventional reactions.

This application is a continuation-in-part of my application Serial No. 793,761 filed December 24, 1947, now abandoned.

I claim:
1. 2,4-diamino-6,7-di-(monocyclic aryl)pteridines.
2. 2,4-diamino-6,7-diphenylpteridine.

CORNELIUS K. CAIN.

References Cited in the file of this patent

UNITED STATES PATENTS

| Number | Name | Date |
|--------|------|------|
| 2,568,597 | Seeger | Sept. 18, 1951 |

FOREIGN PATENTS

| Number | Country | Date |
|--------|---------|------|
| 231,852 | Switzerland | July 17, 1944 |

OTHER REFERENCES

Daniel et al., J. Biol. Chem. 169, 689–697 (1947).